United States Patent [19]
Childers et al.

[11] 3,873,214
[45] Mar. 25, 1975

[54] X-Y MEASURING APPARATUS

[75] Inventors: Warren Childers; David L. Zipps, both of Houston, Tex.

[73] Assignee: Graphic Arts Mfg. Co., Inc., Houston, Tex.

[22] Filed: Jan. 29, 1973

[21] Appl. No.: 327,827

[52] U.S. Cl. ............................. 356/213, 356/244
[51] Int. Cl. .............................................. G01j 1/00
[58] Field of Search...... 33/1 M; 356/167, 199, 203, 356/213, 244, 256; 346/46

[56] References Cited
UNITED STATES PATENTS
3,108,844 10/1963 Alexander et al. .................. 346/46

*Primary Examiner*—Ronald L. Wibert
*Assistant Examiner*—Paul K. Godwin
*Attorney, Agent, or Firm*—Donald Gunn

[57] ABSTRACT

An X-Y measuring apparatus which includes a working surface for placing a piece of printed matter thereon whereby the apparatus measures the optical density of the printing in testing for uniformity, color and consistency, the apparatus utilizing an optical densitometer of the reflective type. The head of the reflective densitometer is moved through desired X-Y locations at a controlled distance vertically from the specimen. The apparatus includes a U-shaped support member which carries the head of the densitometer. The U-shaped member has one arm to the rear of the working surface and the other arm supporting the measuring head a controlled distance above the working surface. On the back side, the arm includes a set of wheels which track against the back of the working surface and a second set of wheels which bear against a lengthwise backup surface forcing the wheels, and the arm of the U-shaped member towards the working surface. The other arm of the U-shaped member is therefore cantilevered a precise distance above the working surface and specimen. A cable system prevents canting or cocking of the U-shaped member as it is moved transversely of the X-Y surface.

12 Claims, 7 Drawing Figures

PATENTED MAR 25 1975 3,873,214

X-Y MEASURING APPARATUS

BACKGROUND OF THE INVENTION

In the manufacture of food and beverage containers of tin coated steel or aluminum, advertising, list of ingredients, trademarks and other symbols are printed on the exterior. It is desirable to maintain consistency in the printing. However, inconsistencies can arise which are highly undesirable. A variation in optical density will be noted by a customer. Decorated metal goods of this sort are printed with such speed that a slight drift in the printng apparatus, either in the color of the ink or in the rate of feed or some other factor, can produce several thousand misprinted units before inspection. The cost of overprinting to correct and repair the mistake is nearly prohibitive.

In a similar vein, film containers, plastic coated paper, heavy cardboard containers or multi-layered containers are likewise printed in the same manner. The apparatus of the present invention can also be used to control the quality of the printing and the consistency of the colors. The apparatus of the present invention is also applicable to use with printing on material other than metal, although it will probably find its greatest application in the metal decorating industry.

Heretofore, the testing of printed or decorated metal goods, has been suspect. The ink is applied in a press and thereafter is baked to dry the ink. As a consequence of the nonabsorbant nature of the decorated metal goods and indeed, many of the plastic coated packaging materials, the ink cannot be touched for fear of smudging. Once the ink has been smudged, a reading cannot be taken at that particular location because the ink has been moved around and the reading may be incorrect as a result. Ordinarily a sample or specimen is taken from the printing or manufacturing facility, prior to baking and drying and the ink is tested. The ink must be tested by the use of visual inspection. Sometimes an optical densitometer will be used, but it cannot be allowed to touch the surface. As a consequence, it is held bove the specimen being tested. The vertical spacing of an optical densitometer, however, varies the reading of the densitometer. In other words, the optical densitometer will give different readings on the same specimen. if it is held at different distances from the specimen. It is helpful to hold an optical densitometer at a fixed distance to obtain readings which are meaningful. This is quite difficult to do in view of the fact that the measurements are normally taken on a printed sheet which can extend perhaps to sizes of three or four feet in width and lengths greater than the width.

SUMMARY OF THE INVENTION

It is with the foregoing in view that the present invention has been devised. The present invention relates to an X-Y testing or monitoring apparatus. It preferably incorporates a large stand which has a sloping working surface. A specimen to be tested or measured is placed on the working surface. It is held there by means of a vacuum pull which engages the back side of the specimen through a small trough which extends around the working surface. This pulls the specimen snugly against the working surface and controls its location with respect to the working surface. A movable head for an optical densitometer is mounted immediately above the specimen by the present invention to make the necessary measurements. The present invention incorporates a U-shaped mounting member which supports the head on one of two arms. One arm is positioned above and parallel to the working surface. Its vertical spacing is the critical factor and is controlled by apparatus connected to the other arm. The other arm of the U-shaped member is pinioned between the working surface and a backup surface. It moves between these two surfaces on rollers which engage both surfaces. However, it is forced against the working surface. The U-shaped member is slidable on a journal about an elongate mounting rod extending the length of the equipment. The U-shaped member is thus movable to the left and right over the specimen. It is journaled to the mounting rod and in addition, cant or wobble about the journal is prevented by means of a pulley and cable system. The pulley and cable system is preferably duplicated at two locations in perpendicular planes to thereby limit movement of the U-shape member with respect to the two planes. As a consequence, the U-shaped member is held rigid with respect to orthogonal planes and is thus movable in the third plane in a straight line without wobble or cant.

DESCRIPTION OF THE PREFERRED EMBODIMENT

Figure 1:
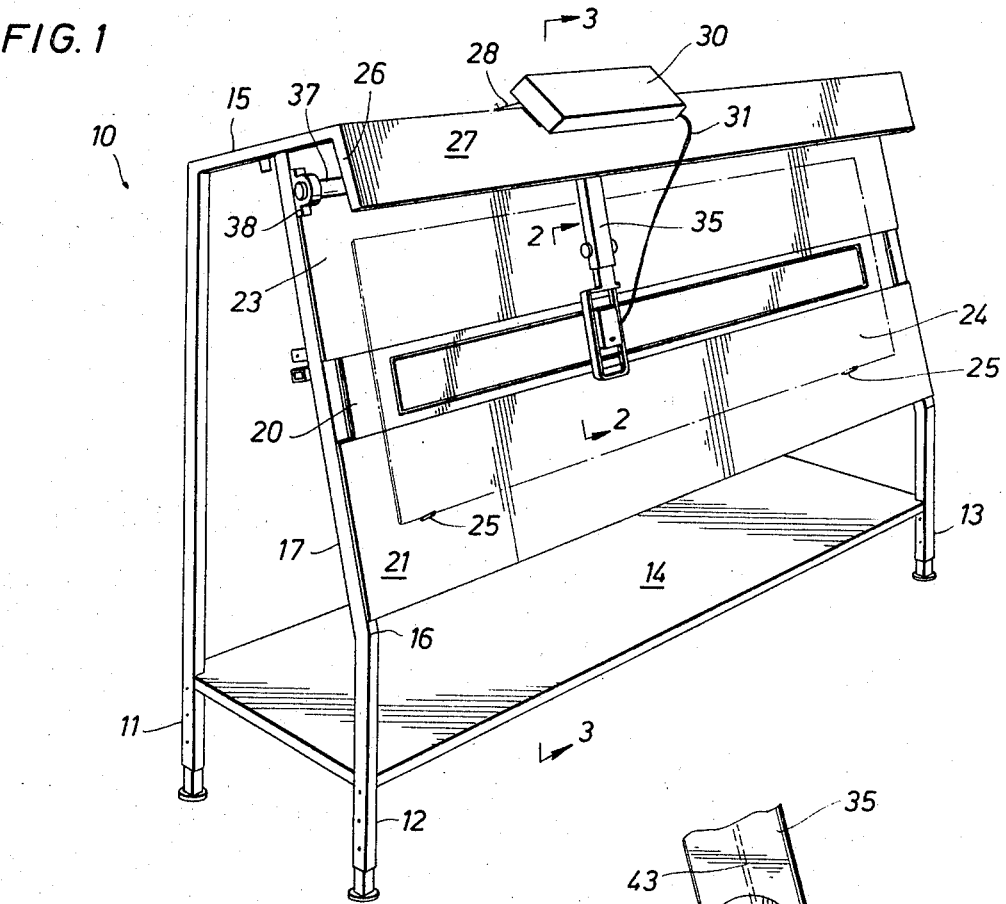
FIG. 1 is a perspective view of the complete apparatus of the present invention.

Attention is first directed to FIG. 1 of the drawings where the numeral 10 identifies the monitoring apparatus of the present invention. The apparatus incorporates a large stand which includes a set of legs at 11, 12, and 13, and a fourth leg which is not visible in FIG. 1. The legs are connected to a tray 14. The back legs, including the leg 11, extend upwardly to a top frame member 15. The front legs 12 and 13 are vertical and are shorter. The front leg 12 bends at 16 and is connected with a frame member 17 which is perpendicular to the member 15 at the top. The frame member 17 extends at an angle which is not quite vertical to thereby support a working surface at an angle which can be more easily viewed by the user. The exact angle is subject to variation.

The frame member 17 actually supports a facing plate 21 of substantial size. The plate 21 extends along the full length of the frame member 17 and fully across the face of the aparatus. The plate 21 supports a specimen 24 on a pair of protruding pegs 25. The plate 21 is preferably planar but warpage and variations in its shape or contour are not critical. It provides a support surface for the specimen 24 to hold the edges of the specimen while actual measurements are made on a working surface 20. The position of the working surface 20 and warpage thereof thus are more critical and are controlled by the present invention in a manner to be described.

The plate 21 is thus located below the working surface while a similar plate 23 is positioned above the working surface 20. The working surface 20 thus is inserted between the plate members 21 and 23 and as illustrated in FIG. 1, the members 21 and 23 support the full sheet of the specimen.

The frame member 15 extends forwardly to an additional frame member 26 which extends downwardly supporting a face plate 27 which covers the moving parts of the present invention. A mounting bracket 28, better shown in FIG. 3, supports an optical densitometer 30. The optical densitometer preferably used is that disclosed in patent application Ser. No. 117,354, now U.S. Pat. No. 3,765,776, of Frank R. Bravenec, assigned to a common assignee of the present application. The densitometer 30 used in the present invention is similar in all respects to the densitometer disclosed in that application with the exception of the head. The present invention preferably utilizes a reflection densitometer. In a reflection densitometer, the head carries a light source of regulated intensity to thereby direct a regulated amount of light onto the specimen to be tested. The light which is reflected from the specimen is returned to the head and is then transferred to the measuring equipment within the densitometer 30 for measurement and indication. The densitometer 30 incorporates a flexible cable 31 which includes wiring and fiber optics which extend to a head member 32 better shown in FIG. 2. The head member 32 holds and supports the regulated light source and also supports the lens system 33 which focuses the reflected light on the end of the fiber optics to transfer the light signal to the larger box for measurement.

The densitometer apparatus thus incorporates a fixed portion and a movable head. The readings are taken at the movable head and are indicated at the fixed portion. Hereinafter, references to the head will refer to the portion of equipment must be positioned at a controlled elevation above the specimen. References to the densitometer will refer to the system as a whole and particularly to the fact that it provides an indication visible to an operator of the measured density of the printing.

Returning to FIG. 1, the optical densitometer is mounted on one arm 35 of a U-shaped member 36 (see FIG. 3) for movement to the right and left on a guide rod 37. The guide rod is connected to the frame member at 38 (FIG. 1). It is held secure and parallel to the working surface 20. The working surface is adjustable in vertical height by means of extensions in the legs. Also, levelling of the apparatus can be obtained if necessary.

Figure 2:
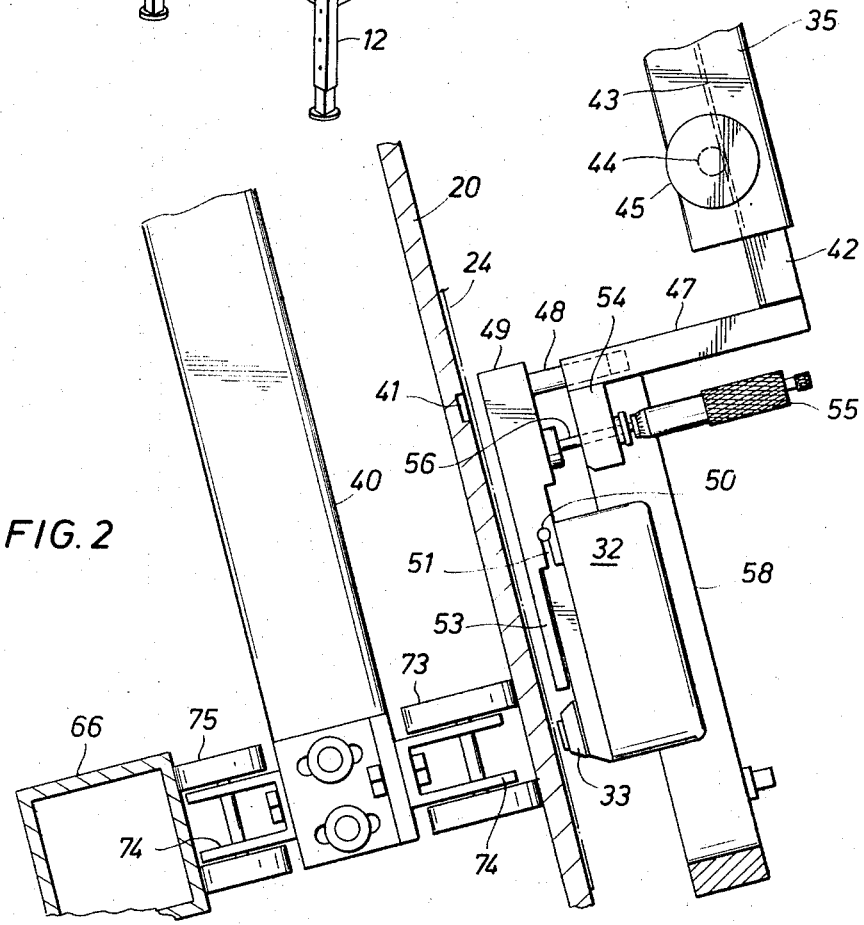
FIG. 2 is a sectional view along the line 2 — 2 of FIG. 1 of the drawings showing the measuring head of the optical densitometer with respect to a specimen whereby measurements at a controlled elevation above the specimen are obtained.

Attention is next directed to FIG. 2 of the drawings where the arm 35 is shown in greater detail. In FIG. 2, the numeral 40 identifies the second arm of the U-shaped member 36. It will be observed that they are on opposite sides of the working surface 20. The apparatus shown in FIG. 2 positions the head 32 of the densitometer at a fixed elevation above the working surface. The specimen 24 is pulled against the working surface by means of a vacuum channel 41. A groove is preferably formed at some distance inboard from the edge of the working surface 20 to engage the back side of the specimen at substantially its full length. A vacuum pump (not shown) draws a vacuum in the groove 41. The vacuum pump is preferably connected through the back side of the working surface 20. In the event the specimen is shorter than the groove 41, a rubber plug contoured to fit in the groove and to contact the edge of the specimen is plugged into the groove. This thus shortens the groove to match the specimen being tested. It also prevents leakage into the groove which would defeat the vacuum. The vacuum that it pulled need not be excessive but is sufficient to draw the specimen 24 against the working surface. This controls the location of the specimen and thus permits measurements from a fixed elevation thereabove.

In FIG. 2, the numeral 42 identifies a telescoping member within the arm 35. The member 42 carries on one side a rack 43 which is engaged by a pinion 44 on a hand knob 45 which can be rotated to extend the head. Rotation of the knob 45 extends the telescoping arm 42 from the arm 35. It also can be rotated to retract. Movement in either direction moves the head 32 as will be observed. The arm 42 connects with a perpendicular hollow member 47. The member 47 receives a pin 48. The pin 48 is connected to a mounting plate 49. The plate 49 is perpendicular to the pin 48. The mounting plate 49 supports the head 32. The head 32 is preferably connected to a pivot pin 50 which is received within a slot 51 in the plate 49. This permits the head 32 to pivot in a counterclockwise direction as viewed in FIG. 2. Its clockwise direction of rotation is limited by the extension 53 on the mounting plate 49. In other words, the head shown in FIG. 2 is positioned for taking a reading. It can be pivoted upwardly through about 90° for servicing, removal or the like.

The pin 48 is duplicated at two locations as is the hollow member 47. They are preferably arranged on the left and right of the head to define a support structure for the head which matches or exceeds the width of the head. The head has a width in the range of about two to three inches while the mounting pins 48 are located perhaps 4 or 5 inches apart. This provides a more stable arrangement.

The hollow members 47 are rigidly connected to a projecting tab 54 which is perpendicular to the hollow tubular members 47. This places it parallel to the mounting plate 49. A micrometer adjustment 55 is supported by the tab 54. The adjustment 55 is rigidly attched and has a slidable pin 56 which connects with the mounting plate 49. The pin 56 is moved inwardly and outwardly by the micrometer adjustment. The micrometer adjustment is manipulated to extend or retract the pin and move the mounting plate with it by controlled increments. The measure is obtained by reading the markings on the micrometer adjustment 55. The micrometer adjustment 55 positions the head 32 at a precise and controllable elevation above the specimen 24. The pin 56 both pushes or pulls as desired. With the use of the three parallel pins including the two pins 48, movement of the mounting plate 49 and hence the head 32, is maintained in a line perpendicular to the arm 35.

The hollow members 47 are connected to a U-shaped handle 58 which can be hand engaged to move the head and all the connected aparatus to the right and left of the working surface 20 as viewed in FIG. 1.

Figure 3:
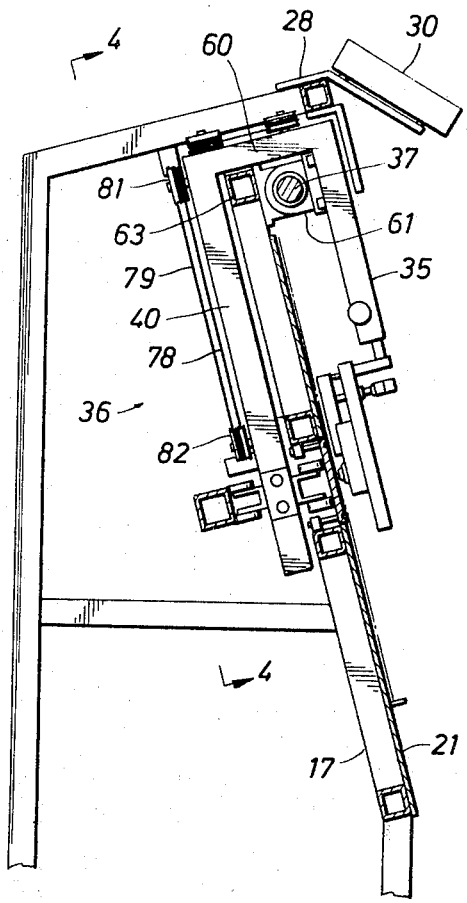
FIG. 3 is a sectional view along the line 3 — 3 of FIG. 1 which view is smaller in scale than FIG. 2 and shows the U-shaped member on which the optical densitometer head is mounted.

Attention is next directed to FIG. 3 where the arms 35 and 40 of the U-shaped member are illustrated. The numeral 60 refers to the cross-arm. The cross-arm 60 extends between the arms 35 and 40 and constitutes the third side of the U-shaped member. Moreover, they are preferably arranged perpendicular to one another. All three of the arms move as a unit and are supported by the guide rod 37. A journaled connection to the guide rod is accomplished by the apparatus at 61 which is supported on the inside corner of the arms 35 and 60. A journal mechanism is joined to the arms 35 and 60. The Journal 61 is preferably of substantial width, typically in the range of three to six inches or more, to position the U-shaped member 36 perpendicular to the guide rod 37. The journal connection 61 is observed in FIG. 3 to engage the guide rod 37 from above. The guide rod 37 is parallel to a rectangular frame member 63 which is parallel to the rod and of the same extent. The U-shaped member 36 surrounds the guide rod 37 and the frame member 63 on three sides. The members 37 and 63 have a greater length than the length of travel of the U-shaped member 36 and are thus anchored at the ends of the table as better shown in FIG. 1 of the drawings.

The frame members at the end of the table are likewise located beyond the range of travel of the U-shaped member 36. The U-shaped member 36 is thus free to travel from end to end of the equipment, limited only by the location of the frame members. The present invention incorporates significant advances over the art in the inclusion of means which will be described to enable the optical densitometer head 32 to move in a parallel fashion, without cant or wobble, and at a controlled elevation. For this purpose, attention is momentarily directed to FIG. 6 of the drawings.

Figure 6:
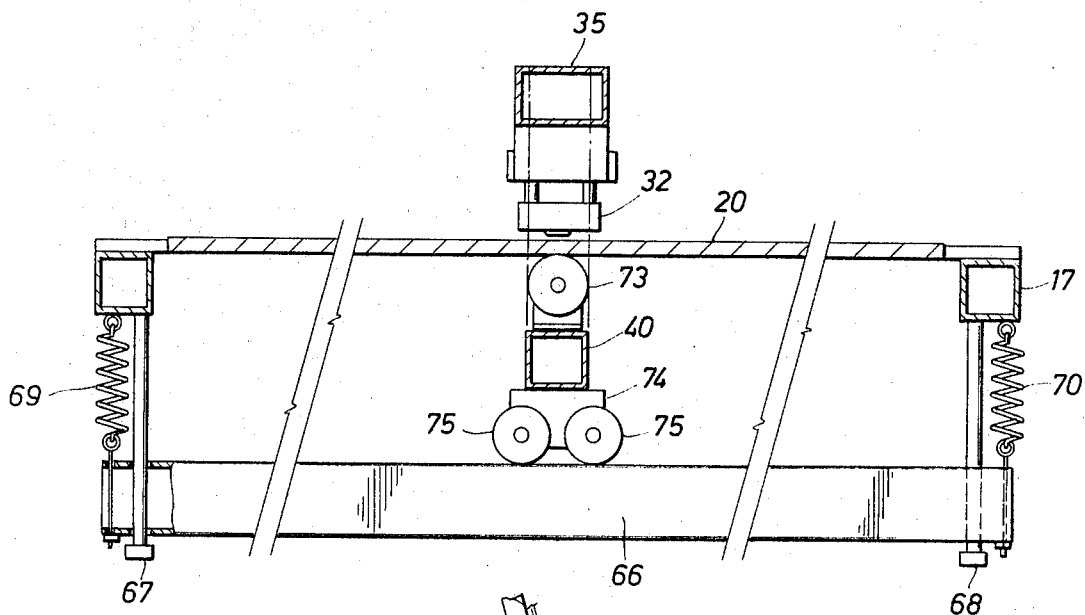
FIG. 6 is a sectional view taken along the line 6 — 6 of FIG. 4 showing the mounting of the working surface and the extreme end of the U-shaped member wherein its position is controlled and is fixed with respect to the working surface; and, FIG. 7 is a sectional view along the line 7 — 7 of FIG. 4 showing the apparatus for adjusting the working surface to maintain parallelism.

In FIG. 6, the arms 35 and 40 of the U-shaped member are shown in sectional view. They are on opposite sides of the working surface 20. The sectional view of FIG. 6 shows the length of the equipment. The working surface is paralleled by a frame member 66. The frame member 66 is held in position by a pair of bolts 67 and 68. The frame member 66 fits loosely on the bolts. A spring 69 is connected to the frame member 66 and a similar frame member 70 is at the opposite end. The springs 69 and 70 pull the frame member 66 toward the working surface 20.

The arm 40 carries a mounting bracket 72 near its end. The mounting bracket supports a wheel 73 which is contacted against the back side of the working surface. The working surface 20 is a substantial metal member which is machined to a rather precise thickness all along its length. In other words, there are no undulations or irregularities in thickness. The two faces of the working surface 20 are parallel to a degree of precision of about 0.005 inches. A greater degree of accuracy is permissible as desired.

The numeral 74 identifies a mounting bracket on the back side of the arm 40. It supports four wheels which are indicated by the numeral 75. The four wheels contact the frame member 66. The frame member 66 is pulled toward the wheels and indeed, forces the arm 40 toward the working surface. The arm 40 positions the wheel 73 firmly against the working surface.

Returning now to FIG. 2 of the drawings, the apparatus illustrated in FIG. 6 described above is shown in an orthogonal view. It will be observed that the arm 40 is pushed to a specified distance from the working surface 20. This then positions the arm 35 a specified height above the working surface 20. This supports the detector head 32 at a specified elevation.

Figure 4:
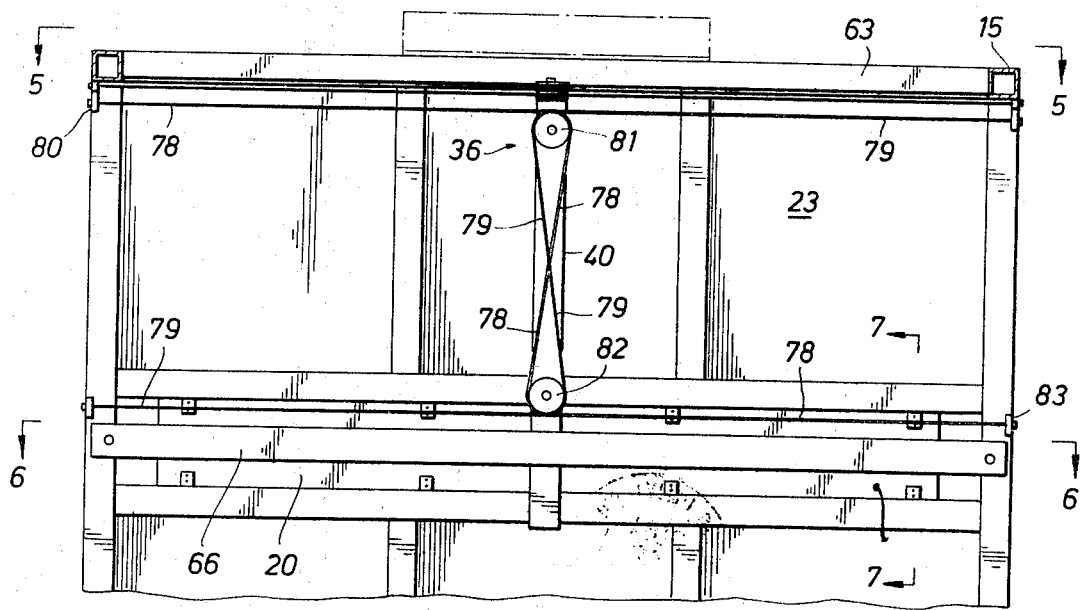
FIG. 4 is a view perpendicular to the back of the working surface illustrating details of the U-shaped member and the cable and pulley system which maintains the U-shaped member without wobble or cant.

Attention is next directed to FIG. 4 of the drawings which is a back view of the working surface 20 and the arm 40. The arm 40 is shown extending from the upper portions of the figure to a point opposite the working surface 20 and the frame member 66 previously described. It will be recalled that the U-shaped member 36 is supported on the guide rod 37 which is parallel to the frame member 63 at the upper portion of FIG. 4. It will be further recalled that a journal 61 supports the U-shaped member on the guide rod. It is possible that some wobble might occur in the journal and as viewed in FIG. 4, the lower end of the arm 40 might rock or swing left or right about the journal. FIG. 4 illustrates apparatus which prevents the lower end of the arm 40 from rotating to the left or right about the upper end. The apparatus enables the U-shaped member 36 to move evenly to the right or left. The entire arm moves in a plane perpendicular to the frame members 63 and 66 and also perpendicular to the working surface 20.

The numeral 78 identifies a first cable while the numeral 79 identifies a second cable. The cable 78 begins at the upper left hand corner of FIG. 4 where it is secured to a suitable mounting bracket 80. The cable 78 then extends to a first pullley at 81 and extends along the arm 40. A second set of pulleys is indicated at 82. The cable 78 then extends at the lower right hand corner of FIG. 4 to an additional mounting bracket 83. The numeral 79 identifies a second cable which from the lower left hand corner of FIG. 4 where it is supported by a similar fixed bracket and extends about the pulleys at 82, the pulleys at 81 and finally terminating at a mounting bracket in the upper right hand corner of FIG. 4. The pulleys at 81 and 82 are mounted on shafts which extend perpendicularly from the arm 40. There are two pulleys at each location comprising a total of four pulleys in all. The cable 78 passes over one pulley at 81 and a second pulley at 82. The same is true for the cable 79. The cable 79 passes over the cable 78 utilizing the perspective of FIG. 4.

The cable arrangement maintains the arm 40 in a plane perpendicular to the frame members 63, 66 and the working surface 20. Consider the possibility that the lower portion of the arm 40 would deflect to the right as viewed in FIG. 4. Deflection of the arm 40 to the right at its lower end would carry the pulleys 82 to the right. This would permit slack in the cable 78. However, this would stretch the cable 79. Movement to the left would place slack in the cable 79 while it would tend to elongate the cable 78. The cables 78 and 79 are preferably of aircraft cable quality. In other words, they are extremely strong cables with a high degree of flexibility. They do not elongate except undr extremely substantial loads. They are preferably maintained in equal tension at the time of installation.

In FIG. 3, the two pulley arrangement is better shown. The cables 78 and 79 are shown in different planes and the pulley arrangements at 81 and 82 clearly illusrate the use of two pulleys on a common shaft at each location.

Figure 5:
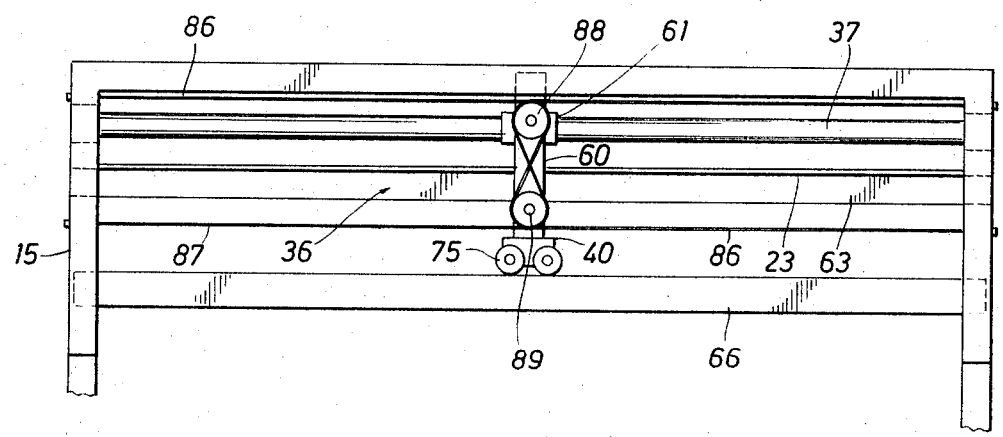
FIG. 5 is a view at right angles to FIG. 4 showing the second cable and pulley system, which, in conjunction with the system of FIG. 4, prevent wobble and cant of the U-shaped member.

Attention is next directed to FIG. 5 of the drawings which is taken at right angles to FIG. 4. In FIG. 5, a second and similar cable arrangement is shown for maintaining the U-shaped member 36 in parallelism to enable it to track as it moves with respect to the working surface. In FIG. 5, the side 60 of the U-shaped member is shown extending from the guide rod 37. The U-shape member is supported on the journal 61. For purposes of description, it might be conjectured that the U-shaped member 36 might wobble about the journal 61. The side 60 would thus pivot to the right or to the left with respect to the journal. Wobble of this sort is prevented by the arrangement shown in FIG. 5. In FIG. 5, the numeral 86 identifies a first cable while the numeral 87 identifies a second cable. The cable 86 extends to a first pulley arrangement 88 and then to a second pulley arrangement 89. The cable 86 then connects to the frame. The cable 86 connects from the upper left frame shown in FIG. 5 to the lower right frame connection. The cable 87 extends from the lower left connection to the upper right connection. All four connections are made to frame members. Each connection is made fast and the cables are pulled taut.

Suppose for purposes of description that the arm 60 pivots about the journal 61 to deflect to the right. In this event, the cable 86 will be shortened or slackened. Such a movement or deflection would pull additional tension in the cable 87. Inasmuch as the cables are quite taut, the cable 87 is unable to stretch and therefore, such movement is prevented. Movement in the opposite direction is prevented by the other cable. The two cables are preferably inextensible. This fact coupled with the routing of the two cables shown in FIG. 5 prevents the side 60 from wobbling about the journal 61 which supports the U-shaped member on the guide rod 37.

Through the use of the tension cable arrangements shown in FIGS. 4 and 5, the U-shape members moves in a plane remaining perependicular to the guide rod 37. Moreover, wobble or canting of the U-shaped member is prevented by this arrangment.

Figure 7:
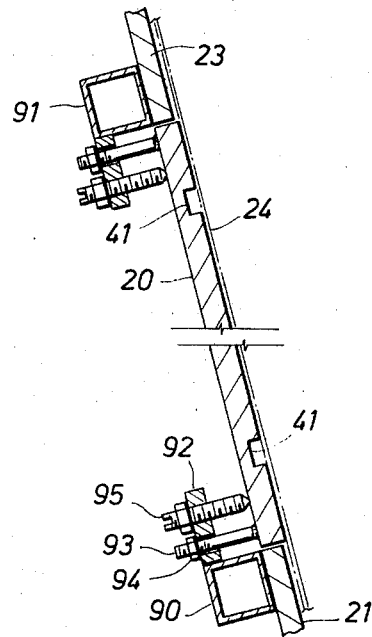

Attention is next directed to FIG. 7 of the drawings. In FIG. 7, the apparatus is shown which locates the working surface 20. It will recalled that the working surface 20 is a surface against which measurements are actually made of a specimen 24. The working surface does the positioning which enables the specimen 24 to be held at a fixed distance from the densitometer head 32. In FIG. 7, the working surface 20 as shown parallel to and between the lower and upper surfaces 21 and 23. The surfaces 21 and 23 are supported by suitable frame members such as the rectangular frame members 90 and 91. The members 90 and 91 extend along the length of the equipment. The apparatus of FIG. 7 is located at several points along the length of the equipment so that the position of the working surface can be adjusted at all points to accommodate warpage and the like. The apparatus at the lower portion of FIG. 7 will be described and it will be appreciated that it is duplicated in the upper part of FIG. 7. Moreover, the apparatus is duplicated at many other places on the equipment. A tab 92 is welded to the frame member 90. A support post 93 extends through an opening in the tab 92. The post 93 is welded to the working surface 20. A nut 94 is threaded to the post 93. In addition, a threaded stud 95 is threadly recieved in a tapped opening in the tab 92 and bears against the back of the working surface 20. It is not welded to it but rather simply contacts it. As mentioned above, this arrangement is duplicated at other places functions in the following manner.

The stud 95 is threaded to extend to a point in contact with the working surface 20. The nut 94 is tightened to pull the working surface toward the stud. Manipulation of the nut 94 and the stud 95 tends to work against one another. However, this is for the purpose of pulling the working surface toward the frame members and holding it at a specific location with respect to the frame members. When the working surface is first installed, it is not necessarily parallel to the guide rod 37. The apparatus shown in FIG. 7 is used to place it in a parallel position. The apparatus is adjusted at various points along the length of the working surface to place it in a parallel position. The plane of the working surface must preferably be parallel to the plane in which the detection head 32 moves. This second requirement is also accomplished through the use of the apparatus of FIG. 7. It might be necessary to rotate the working surface either clockwise or counterclockwise as viewed in FIG. 7. The upper end of the working surface might have to move to the left or to the right with respect to the lower end. Such movement is accomplished by adjusting the means illustrated in FIG. 7. It might be determined that the center portion of the working surface has sagged. In this event, the stud adjacent to the sag is extend and tends to counteract the sag.

Operation of the present invention should be understood from the foregoing explanation. The apparatus is used by placing a specimen 24 on the working surface, resting on the pins 25 shown in FIG. 1. The vacuum which is pulled in the passage or channel 41 flattens the specimen against the working surface. The densitometer head 32 is moved to any location and is always maintained at a specified elevation above the specimen. From the description of the U-shaped mountng arm 36 and the apparatus which is connected to it to maintain it in a parallel posture, it will be observed that the detection head is moved in the desired plane. The frame member 66 forces the arm 40 toward the working surface. This results in the use of the working surface as a reference to position the U-shaped member. Since the working surface supports the specimen to be measured or tested, and is the reference for the arm which carries the testing apparatus, the measurements are made from the specified elevations.

Many alterations and variations in the present invention may be incorporated, but the scope thereof is determined by the claims which are as follows:

We claim:
1. An X-Y monitoring table, comprising:
  a working surface having two sides on which measurements are made at locations which can be represented by a two coordinate designation of a specimen placed thereon;
  a guide parallel to said working surface;
  a U-shaped means having
    a first arm on one side of said working surface;

a second arm on the other side of said working surface;
an additional side in said U-shaped means joining said arms together;
journal means carried by said U-shaped means for movement along said guide;
means for positioning said second arm at a fixed distance relative to said working surface, said second arm positioning said first arm at a fixed elevation above said working surface; and,
a detection means carried by said U-shaped means by said arm adjacent to the specimen for obtaining a measurement of optical density at a two coordinate designated location on the specimen;
a framework having a pair of elongate, lengthwise members;
a plurality of positioning means on said framework members at multiple points and cooperative by supporting said working surface, said positioning means including
a tab on each of said members;
a shaft associated with each tab and extending from said working surface through each of said tabs; and,
means engaging said working surface to move said shaft selectively toward said tab and thereby move said working surface to a desired position.

2. An X-Y monitoring table, comprising:
a working surface having two sides on which measurements are made at locations which can be represented by a two coordinate designation of a specimen placed thereon;
a guide parallel to said working surface;
a U-shaped means having
a first arm on one side of said working surface;
a second arm on the other side of said working surface;
an additional side in said U-shaped means joining said arms together;
journal means carried by said U-shaped means for movement along said guide;
means for positioning said second arm at a fixed distance relative to said working surface, said second arm positioning said first arm at a fixed elevation above said working surface;
a detection means carried by said U-shaped means by said arm adjacent to the specimen for obtaining a measurement of optical density at a two coordinate designated location on the specimen; and,
first and second reference surfaces adjacent the edges of said working surface, being approximately parallel thereto.

3. The apparatus of claim 2 including a protruding means on one of said reference surfaces for edge supporting a specimen adjacent to said working surface.

4. An X-Y monitoring table, comprising:
a working surface having two sides on which measurements are made at locations which can be represented by a two coordinate designation of a specimen placed thereon;
a guide parallel to said working surface;
a U-shaped means having
a first arm on one side of said working surface;
a second arm on the other side of said working surface;
an additional side in said U-shaped means joining said arms together;
journal means carried by said U-shaped means for movement along said guide;
means for positioning said second arm at a fixed distance relative to said working surface, said second arm positioning said first arm at a fixed elevation above said working surface;
a detection means carried by said U-shaped means by said arm adjacent to the specimen for obtaining a measurement of optical density at a two coordinate designated location on the specimen; and,
a vacuum means in said working surface engaging a selected area of a specimen for pulling such a specimen toward said working surface.

5. The apparatus of claim 4 wherein said vacuum means includes an elongate groove exposed to such a specimen.

6. The apparatus of claim 4 including a micrometer adjustment means adjusting one of said first or second means.

7. An X-Y monitoring table, comprising:
a working surface having two sides on which measurements are made at locations which can be represented by a two coordinate designation of a specimen placed thereon;
a guide parallel to said working surface;
a U-shaped means having
a first arm on one side of said working surface;
a second arm on the other side of said working surface;
an additional side in said U-shaped means joining said arms together;
journal means carried by said U-shaped means for movement along said guide;
means for positioning said second arm at a fixed distance relative to said working surface, said second arm positioning said first arm at a fixed elevation above said working surface;
a detection means carried by said U-shaped means by said arm adjacent to the specimen for obtaining a measurement of optical density at a two coordinate designated location on the specimen;
and wherein said first arm supports said detection means and includes
a telescoping arm portion;
a fixed arm portion; and,
means for moving said telescoping arm portion in or out relative to said fixed arm portion.

8. An X-Y monitoring table, comprising:
a working surface having two sides on which measurements are made at locations which can be represented by a two coordinate designation of a specimen placed thereon;
a guide parallel to said working surface;
a U-shaped means having
a first arm on one side of said working surface;
a second arm on the other side of said working surface;
an additional side in said U-shaped means joining said arms together;
journal means carried by said U-shaped means for movement along said guide;
means for positioning said second arm at a fixed distance relative to said working surface, said second arm positioning said first arm at a fixed elevation above said working surface;
a detection means carried by said U-shaped means by said arm adjacent to the specimen for obtaining a measurement of optical density at a two coordinate designated location on the specimen;

and wherein said first arm supports said detection means and comprises a first arm portion;

a second arm portion supported by said first arm portion and perpendicular to said working surface; and, a movable arm portion movable toward and away from said working surface, said movable arm portion being mounted for movement on said second arm portion.

9. An X-Y monitoring table, comprising:

a working surface having two sides on which measurements are made at locations which can be represented by a two coordinate designation of a specimen placed thereon;

a guide parallel to said working surface;

a U-shaped means having a first arm on one side of said working surface;

a second armm on the other side of said working surface;

an additional side in said U-shaped means joining said arms together;

journal means carried by said U-shaped means for movement along said guide;

means for positioning said second arm at a fixed distance relative to said working surface, said second arm positioning said first arm at a fixed elevation above said working surface;

a detection means carried by said U-shaped means by said arm adjacent to the specimen for obtaining a measurement of optical density at a two coordinate designated location on the specimen;

and wherein said first arm supports said detection means and includes a first slidably connected telescoping means having relatively fixed and movable portions;

adjustable means for adjusting said movable portion to control its position, and, said telescoping means being mounted on said first arm for movement perpendicular to said working surface.

10. An X-Y monitoring table, comprising:

a working surface having two sides on which measurements are made at locations which can be represented by a two coordinate designation of a specimen placed thereon;

a guide parallel to said working surface;

a U-shaped means having a first arm on one side of said working surface;

a second arm on the other side of said working surface;

an additional side in said U-shaped means joining said arms together;

journal means carried by said U-shaped means for movement along said guide;

means for positioning said second arm at a fixed distance relative to said working surface, said second arm positioning said first arm at a fixed elevation above said working surface;

and wherein said first arm includes a first extendable means having relatively fixed and movable portions, said first means being positioned for extension parallel to said working surface;

a second extendable means having relatively fixed and movable portions, said second means being positioned for extension perpendicular to said working surface;

a mounting means on said first arm and supported by said first and second means jointly providing two degrees of movement to said mounting means; and, a detection means carried by said mounting means for obtaining a measurement of optical density at a two coordinate designated location on the specimen.

11. The apparatus of claim 10 including a pivotal connective means on said mounting means for movably supporting said detection means thereon.

12. The apparatus of claim 10 including a rack and pinion means adjusting one of said first or second means.

* * * * *